United States Patent
Nolan et al.

(10) Patent No.: US 10,642,966 B2
(45) Date of Patent: May 5, 2020

(54) PASSWORDS DEFINED USING SEQUENCES OF IMAGES

(71) Applicant: INTERNATIONAL BUSINESS MACHINES CORPORATION, Armonk, NY (US)

(72) Inventors: Colm Nolan, Navan (IE); Mark Maresh, Wake, NC (US); Michael J. Whitney, Cary, NC (US); Juan Vargas, Wake, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 15/827,594

(22) Filed: Nov. 30, 2017

(65) Prior Publication Data

US 2019/0163894 A1 May 30, 2019

(51) Int. Cl.
*G06F 21/36* (2013.01)

(52) U.S. Cl.
CPC ...... *G06F 21/36* (2013.01); *G06F 2221/2113* (2013.01)

(58) Field of Classification Search
CPC .. G06F 21/34; G06F 2221/2113; G06F 21/36; H04L 63/067; H04L 63/10
See application file for complete search history.

(56) References Cited

U.S. PATENT DOCUMENTS

| | | | |
|---|---|---|---|
| 6,246,769 B1 | 6/2001 | Kohut | |
| 8,117,458 B2 | 2/2012 | Osborn, III et al. | |
| 8,590,020 B1 | 11/2013 | Orlovskaya | |
| 8,621,560 B2 | 12/2013 | Sweeley et al. | |
| 8,943,563 B1 | 1/2015 | Orlovskaya | |
| 8,997,215 B2 | 3/2015 | Guriappa Srinivas et al. | |
| 9,219,720 B1 | 12/2015 | Satpathy et al. | |
| 9,245,268 B1 | 1/2016 | Adams et al. | |
| 9,576,123 B2 | 2/2017 | Potnuru et al. | |
| 2004/0230843 A1* | 11/2004 | Jansen | G06F 21/36 726/7 |
| 2005/0027990 A1* | 2/2005 | Ogawa | G06F 21/35 713/184 |
| 2006/0018467 A1 | 1/2006 | Steinmetz | |
| 2010/0322485 A1 | 12/2010 | Riddiford | |
| 2011/0113487 A1 | 5/2011 | Miller | |

(Continued)

OTHER PUBLICATIONS

Chiasson, Sonia et al., "Graphical Password Authentication Using Cued Click Points," European Symposium on Research in Computer Security, Apr. 2017, pp. 1-17.

(Continued)

*Primary Examiner* — Paul E Callahan
(74) *Attorney, Agent, or Firm* — Tihon Pollavets, Esq.; Blanche E. Schiller, Esq.; Heslin Rothenberg Farley & Mesiti P.C.

(57) ABSTRACT

User authentication is facilitated. A plurality of images on one or more display levels is presented to a user in random order. A password is received from the user, and the password includes a set of images selected from the plurality of images and an indication of a particular sequence of the images in the set of images. A determination is made as to whether the password matches a predefined password, and access is provided based on determining there is a match of the password and the predefined password.

20 Claims, 9 Drawing Sheets

(56) References Cited

U.S. PATENT DOCUMENTS

2011/0202982 A1* 8/2011 Alexander ............... G06F 21/36
          726/7
2013/0042318 A1* 2/2013 Thatha ................... G06F 21/34
          726/18

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.
Schaub, Florian et al., "Exploring the Design Space of Graphical Passwords on Smartphones," Symposium on Usable Privacy and Security Jul. 2013, pp. 1-15.

* cited by examiner

PRESENT TO A USER A PLURALITY OF IMAGES ON ONE OR MORE DISPLAY LEVELS, IN WHICH THE PLURALITY OF IMAGES ARE PRESENTED IN A RANDOM ORDER ~700

RECEIVE FROM THE USER A PASSWORD ~702

THE PASSWORD INCLUDING A SET OF IMAGES SELECTED FROM THE PLURALITY OF IMAGES AND AN INDICATION OF A PARTICULAR SEQUENCE OF THE IMAGES IN THE SET OF IMAGES ~704

DETERMINE WHETHER THE PASSWORD MATCHES A PREDEFINED PASSWORD ~706

PROVIDE TO THE USER ACCESS TO A SECURE ENTITY BASED ON DETERMINING THERE IS A MATCH OF THE PASSWORD AND THE PREDEFINED PASSWORD ~708

BASED ON DETERMINING THE PASSWORD FAILS TO MATCH THE PREDEFINED PASSWORD, PRESENT TO THE USER ADDITIONAL IMAGES IN RANDOM ORDER FOR SELECTION BY THE USER ~710

THE PRESENTING INCLUDES

DISPLAYING ON ONE SCREEN ONE OR MORE IMAGES FROM WHICH THE USER MAY SELECT ~712

DETERMINING, BASED ON AN INDICATION FROM THE USER THAT THE USER IS FINISHED WITH THE ONE SCREEN, WHETHER MORE IMAGES ARE TO BE DISPLAYED ~714

REPEATING THE DISPLAYING BASED ON DETERMINING MORE IMAGES ARE TO BE DISPLAYED ~716

THE DETERMINING WHETHER THE PASSWORD MATCHES THE PREDEFINED PASSWORD IS PERFORMED BASED ON DETERMINING MORE IMAGES ARE NOT TO BE DISPLAYED ~718

FIG. 7A

THE DISPLAYING FURTHER INCLUDES DISPLAYING ALONG WITH THE ONE OR MORE IMAGES ONE OR MORE SEQUENCE INDICATIONS FROM WHICH THE USER MAY SELECT TO INDICATE A SEQUENCE FOR A SELECTED IMAGE ~720

THE ONE OR MORE SEQUENCE INDICATIONS INCLUDE ONE OR MORE NUMBERS ~722

THE RECEIVING THE PASSWORD INCLUDES RECEIVING FROM THE USER AN INDICATION OF A SELECTION OF EACH IMAGE OF THE SET OF IMAGES AND FOR EACH IMAGE A SEQUENCE INDICATION ~724

THE RECEIVING THE INDICATION OF THE SELECTION OF EACH IMAGE INCLUDES RECEIVING AN INDICATION OF AN ASSIGNED VALUE OF THE IMAGE ~726

THE PRESENTING INCLUDES

DISPLAYING ON A SCREEN ONE OR MORE IMAGES AND ONE OR MORE SEQUENCE NUMBERS ~728

RECEIVING AN INDICATION FROM THE USER TO HAVE MORE IMAGES DISPLAYED ~730

REPEATING THE DISPLAYING AT LEAST ONE TIME AND STOPPING THE REPEATING BASED ON RECEIVING AN INDICATION FROM THE USER THAT NO MORE IMAGES ARE TO BE DISPLAYED ~732

THE RECEIVING FROM THE USER THE PASSWORD INCLUDES RECEIVING FROM THE USER AN INDICATION OF THE SET OF IMAGES OF THE PASSWORD AND FOR EACH IMAGE OF THE SET OF IMAGES A SEQUENCE NUMBER FOR THAT IMAGE ~734

THE RECEIVING THE PASSWORD INCLUDES RECEIVING FOR EACH IMAGE OF THE SET OF IMAGES A SEQUENCE INDICATION ASSIGNED TO THAT IMAGE ~736

PASSWORDS DEFINED USING SEQUENCES OF IMAGES

BACKGROUND

One or more aspects relate, in general, to user authentication, and in particular, to facilitating the creation and use of passwords used in authentication.

Secure access is of paramount importance in many environments, including those that provide access to data, information, currency, and/or physical access to a location, such as, for instance, a building, a vehicle, etc. Such access may require the use of a password.

Passwords are used by users in many daily tasks, including accessing a computer, a mobile device, an account, etc., to name just a few examples. However, the need for increased security has made it more difficult for users to create and/or remember passwords.

SUMMARY

Shortcomings of the prior art are overcome and additional advantages are provided through the provision of a computer-implemented method of facilitating authentication. The method includes presenting to a user a plurality of images on one or more display levels, in which the plurality of images are presented in a random order. A password is received from the user, and the password includes a set of images selected from the plurality of images and an indication of a particular sequence of the images in the set of images. A determination is made as to whether the password matches a predefined password, and access to a secure entity is provided to the user based on determining there is a match of the password and the predefined password.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to facilitate authentication of users (e.g., people, systems, etc.) based on using passwords that are image and sequence based. In one example, a highly secure and useful authentication technique is provided that is based on a user correctly selecting from a plurality of images a set of images in a correct sequence. The set of images and the particular sequence define the password to be used to authenticate the user. In one example, the images are not selected directly, but instead, are selected indirectly using an identification associated with the images, such as a number.

In one embodiment, a plurality of images are presented to the user in random order on one or more levels, and the user selects from the presented images the set of images that define the password and provides an indication of the correct sequence of those images. Increasing the number of images displayed increases the security level. Further, long passwords may be easily remembered.

A user may use a password for any number of reasons, including but not limited to, accessing a system, such as a computer system; accessing an account, such as a banking account or other type of account; accessing information or data; and/or obtaining access to a location, such as a building, a vehicle, etc. There are numerous uses for a password and those provided herein are just a few examples.

Moreover, different types of systems may be used to create a password and/or authenticate a password, including, for instance, a computer system. One example of a computer system that may be used to create a password and/or authenticate a password is described with reference to FIG. 1.

Figure 1:
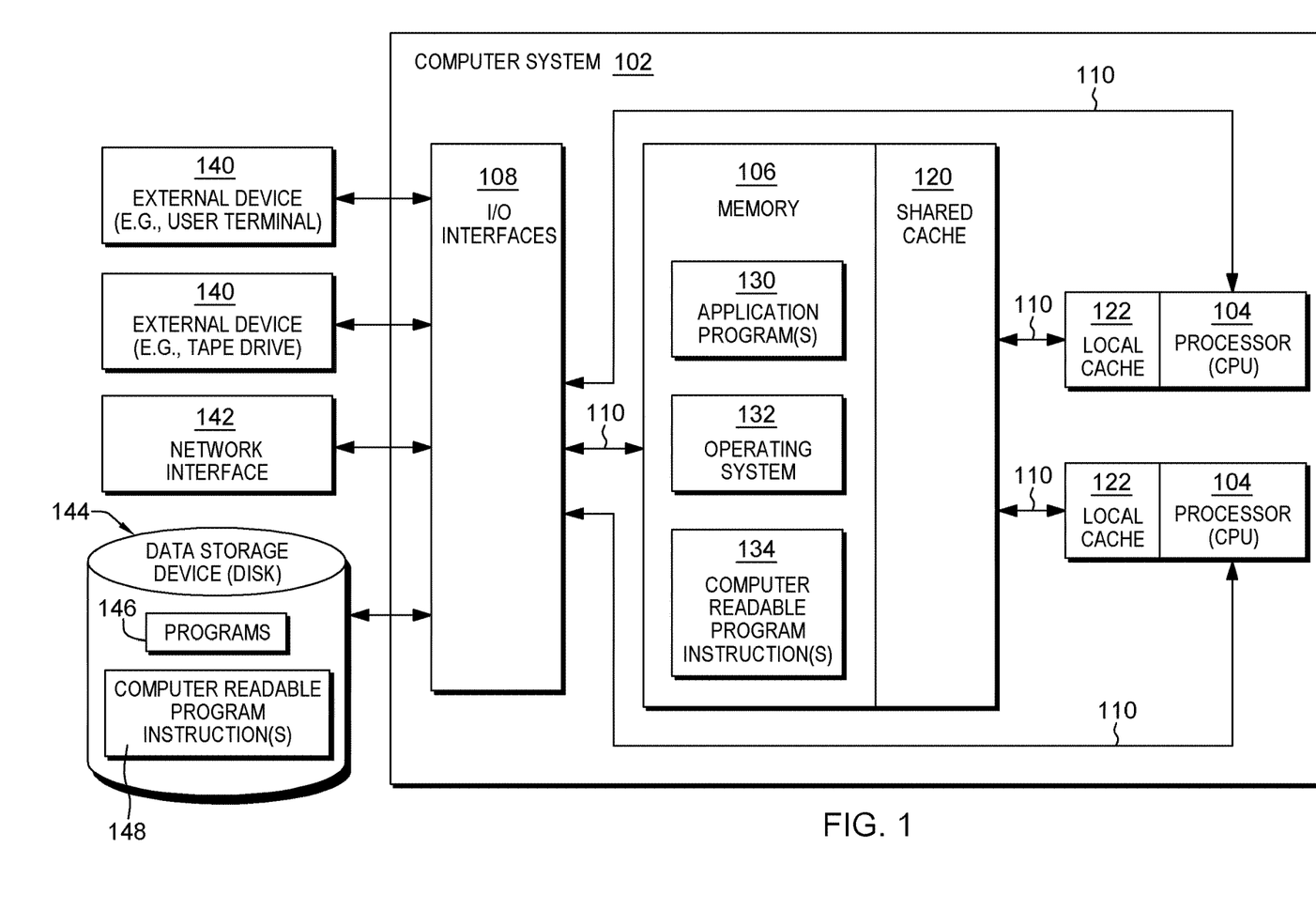
FIG. 1 depicts one example of a computing environment to incorporate and use one or more aspects of the present invention.

Referring to FIG. 1, an example computer system 102 is, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. The computer readable program instructions may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 102 (or other systems or components) may be used by a user to create a password and/or to authenticate a password. To create a password, in one example, the user selects a set of images (e.g., n images) from a plurality of images (e.g., x images) and defines a particular sequence for the set of images. The number of images selected depends on the required or desired length of the password. For instance, if the password is to have a length of four, then four images are selected from the plurality of x images available. For each image selected, a sequence indication, such as a number, is assigned. Although an example of four images for a password is described herein, many other examples and variations are possible without departing from aspects of the present invention.

Figure 2:
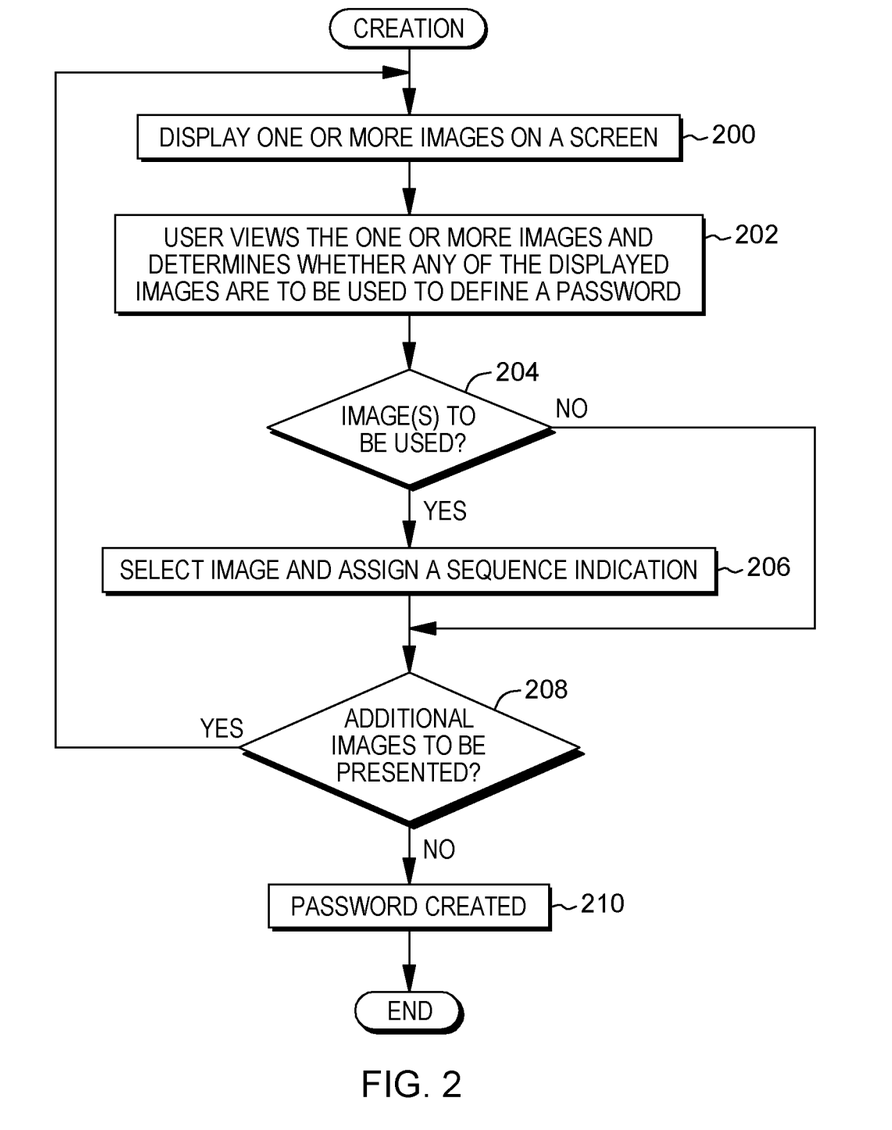
FIG. 2 depicts one embodiment of creating a password, in accordance with an aspect of the present invention.

One embodiment of processing associated with creating a password is described with reference to FIG. 2. This processing may be performed on and/or using a device, including, but not limited to, a processor, or another device that includes processor functions, as examples. Initially, in one embodiment, one or more images are displayed on a screen for view by a user, STEP 200. As examples, the one or more images are loaded and displayed by the user, a service provider or another entity. In one example, any number of images may be displayed at one time. For instance, one image may be displayed at a time, a plurality of images may be displayed at a time, or a combination of the above at different display times. Further, the number of images to be selected to define a password may be configurable. A password may include any number of images, based on, for instance, desired security and ease of use. Many variations are possible without departing from one or more aspects of the present invention.

The user views the one or more images and determines whether any of the displayed images are to be used to define the password, STEP 202. If at least one image is to be used, INQUIRY 204, then each image to be used is selected and a sequence indication (e.g., number) is assigned to the image, STEP 206. As examples, the image may be selected by selecting an image identifier associated with the image, such as a number, a character, a symbol, etc.; assigning the sequence indication; by highlighting the image, or by any other manner.

Thereafter, or if none of the displayed images are to be used, a further determination is made as to whether additional images are to be presented to the user, INQUIRY 208. For instance, if the user has not selected the number of images to be used to define the password (e.g., four in this particular example), then additional images are to be loaded and displayed. Thus, processing continues to STEP 200 in which one or more new images are displayed. The new images may include one or more images that differ from the last set displayed or one or more of the images may be the same. Many variations are possible.

Returning to INQUIRY 208, if the requisite number of images have been selected, then the password has been created STEP 210, which is equal to the selected images in the indicated sequence. For example, for a four image password, the user may have selected a tree assigned sequence 3, a rock assigned sequence 2, a bridge assigned sequence 1, and a sunset assigned sequence 4. Thus, the password is a bridge, a rock, a tree and a sunset in that sequence.

As described herein, in one embodiment, the password is created by selecting a set of images (e.g., n images) from a plurality of images (e.g., x images) and defining a particular sequence for the set of images. Once the password is created, it is saved as a predefined password that may be used for authentication.

One embodiment of authentication is described with reference to FIG. 3. This processing may be performed on and/or using a device, including, but not limited to, a processor, or another device that includes processor functions, as examples. Initially, one or more images are displayed to the user, STEP 300. The display may include none of the images, or one or more of the images of the password. For instance, the service provider (e.g., via the device or system) scrambles the set of images of the password and provides the set of images to the user in random order in one or more displays. Typically, the images of the password are displayed to the user over a plurality of displays. A display may include one image (see, e.g., FIGS. 4A-4D) or a plurality of images (see, e.g., FIGS. 5A-5D or FIGS. 6A-6D), and a display may include none or one or more of the images of the password, as well as none or one or more other images that are not part of the password. The number of images displayed to the user is based on the desired security level. Increasing the number of images displayed at the same time increases the security level.

Figure 3:
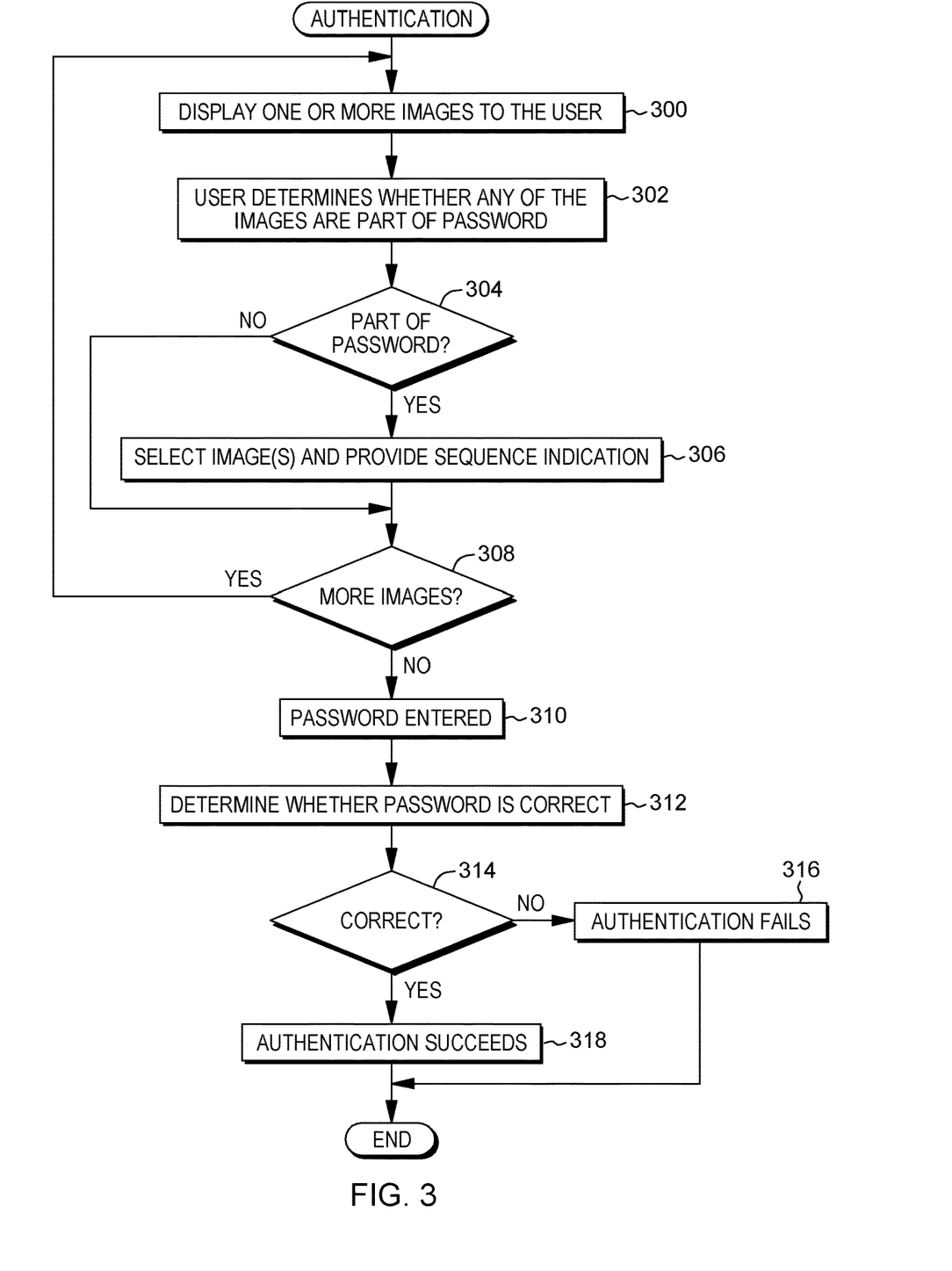
FIG. 3 depicts one embodiment of authentication processing, in accordance with an aspect of the present invention.

Continuing with FIG. 3, from the displayed image(s), the user determines whether any of the images are part of the password, STEP 302. If the user determines that the display includes one or more images of the password, INQUIRY 304, then for each image in the display that the user recognizes as part of the password, the user selects that image and provides an indication of where in the sequence of images defining the password the particular image belongs, STEP 306. For instance, if the user recognizes an image that is third in the password sequence, then the user may input an indication of the image and/or input sequence number 3 associated with that image. This is further described with reference to FIG. 4A.

Figure 4A:
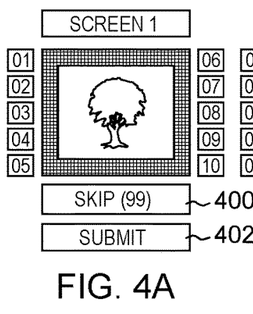
FIGS. 4A-4D depict examples of presenting images for password authentication, in accordance with an aspect of the present invention.
Figure 4B:
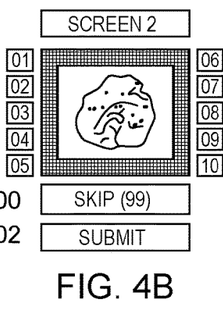
Figure 4C:
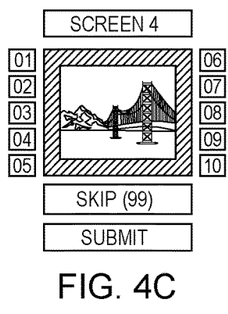
Figure 4D:
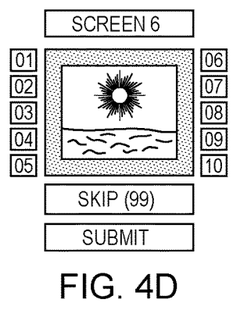
Figures 5A, 5B:
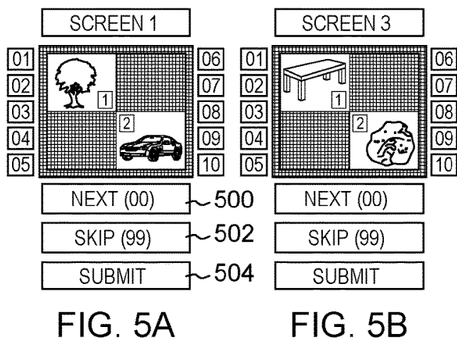
FIGS. 5A-5D depict other examples of presenting images for password authentication, in accordance with an aspect of the present invention.
Figure 5C:
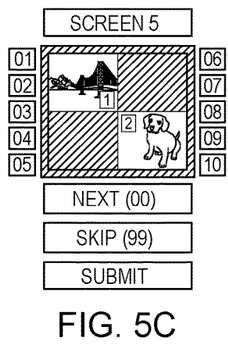
Figure 5D:
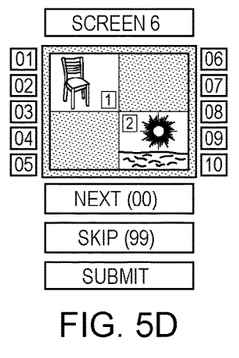
Figures 6A, 6B:
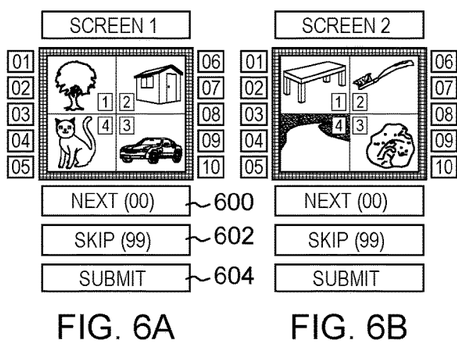
FIGS. 6A-6D depict yet further examples of presenting images for password authentication, in accordance with an aspect of the present invention.
Figure 6C:
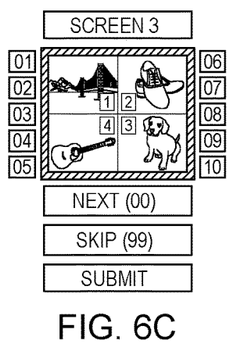
Figure 6D:
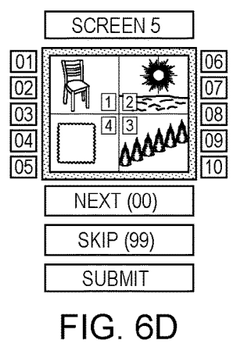

As shown in FIG. 4A, in one example, a single image is displayed. The image is of a tree, which, in one example, is an image of the password. The user recognizes the tree as part of the user's password and further knows that the tree is third in the password sequence; therefore, in one example, the user selects '03'. In another example, the user may select an image indication that represents the tree and also a sequence indication of 3, as described below. If the image is not part of the password, the user may select 'Skip' (400). Other variations are possible.

Returning to FIG. 3, after selecting the one or more images or if there are no images to select, a determination is made as to whether there are more images to be displayed, INQUIRY 308. If more images are to be displayed for selection as part of the password, then processing continues with STEP 300. Otherwise, the password has been entered, STEP 310. Thus, a determination may be made as to whether the password is correct, STEP 312. In one example, this is determined by comparing the entered password with the predefined password. If there is a match, INQUIRY 314, then the password is correct and authentication is a success, STEP 316; otherwise, authentication fails, STEP 318. Based on a successful authentication, the user may be provided access to a secure entity, e.g., to the system, the account, the information, the data, the location, etc.

Examples of the above processing are further described with reference to FIGS. 4A-4D, FIGS. 5A-5D, and FIGS. 6A-6D.

Referring initially to FIGS. 4A-4D, in one embodiment, the system displays one image at a time, and when the user recognizes an image of the password, the user indicates that image and its sequence. For instance, as shown in FIG. 4A, a tree is shown in screen 1, and since this image is part of the password and it is sequence three, the user selects '03'. Also, with reference to FIGS. 4B-4D, the remaining password images displayed on screens 2, 4 and 6 are selected by, for instance, selecting their sequence indications. As indicated, the user did not select the image shown on screens 3 and 5 (not shown), and instead, selected 'Skip' 400 to bring up another screen. When all four images are selected, the user selects 'Submit' 402.

In other embodiments, as shown in FIGS. 5A-5D and FIGS. 6A-6D, the system displays a plurality of images at the same time on, e.g., one screen, and the user may select an indication of a password image and the sequence number associated therewith. The user may select 'Next' (500, 600) until all the images are selected and then, may select 'Submit' (504, 604). If a particular screen does not include an image of the password, the user may select 'Skip' (502, 602). In one example, as shown in FIGS. 5A-5D, the plurality of images depicted at the same time is two, and with reference to FIGS. 6A-6D, the plurality of images depicted at the same time is four. Many other possibilities exist. Further, many techniques for selecting the image and/or the sequence may be used.

As described herein, a user provides a password by selecting images of the password and indicating the sequence of the images. The selection of images is performed indirectly (e.g., by indicating an image identifier (e.g., number) and/or the sequence indication) such that it is more difficult for the password to be intercepted.

In one example, using one or more aspects of the present invention, the probability of hacking a password is equal to the probability of selecting the correct image multiplied by the probability of selecting the correct sequence for that image. For the embodiment depicted in FIGS. 6A-6D, as an example:

16 Images–4 Image Password, 4 Images per screen+1 Skip $(1/17*1/4)*(1/16*1/4)*(1/15*1/4)*(1/14*1/4)$
$=1/14,622,720$ 16 Images–6 Image Password, 4 Images per screen+1 Skip $(1/17*1/4)*(1/16*1/4)*(1/15*1/4)*(1/14*1/4)*$
$(1/13*1/4)*(1/12*1/4)=1/36,498,309,120$.

One or more aspects of the present invention are inextricably tied to computer technology and facilitate processing within a computer, improving performance thereof. In one aspect, using such a password may facilitate processing within the computer system by increasing security and/or facilitating authentication.

Further details of one embodiment of facilitating authentication, and thus, processing within a system, as it relates to one or more aspects of the present invention, are described with reference to FIGS. 7A-7B.

Figure 7A:
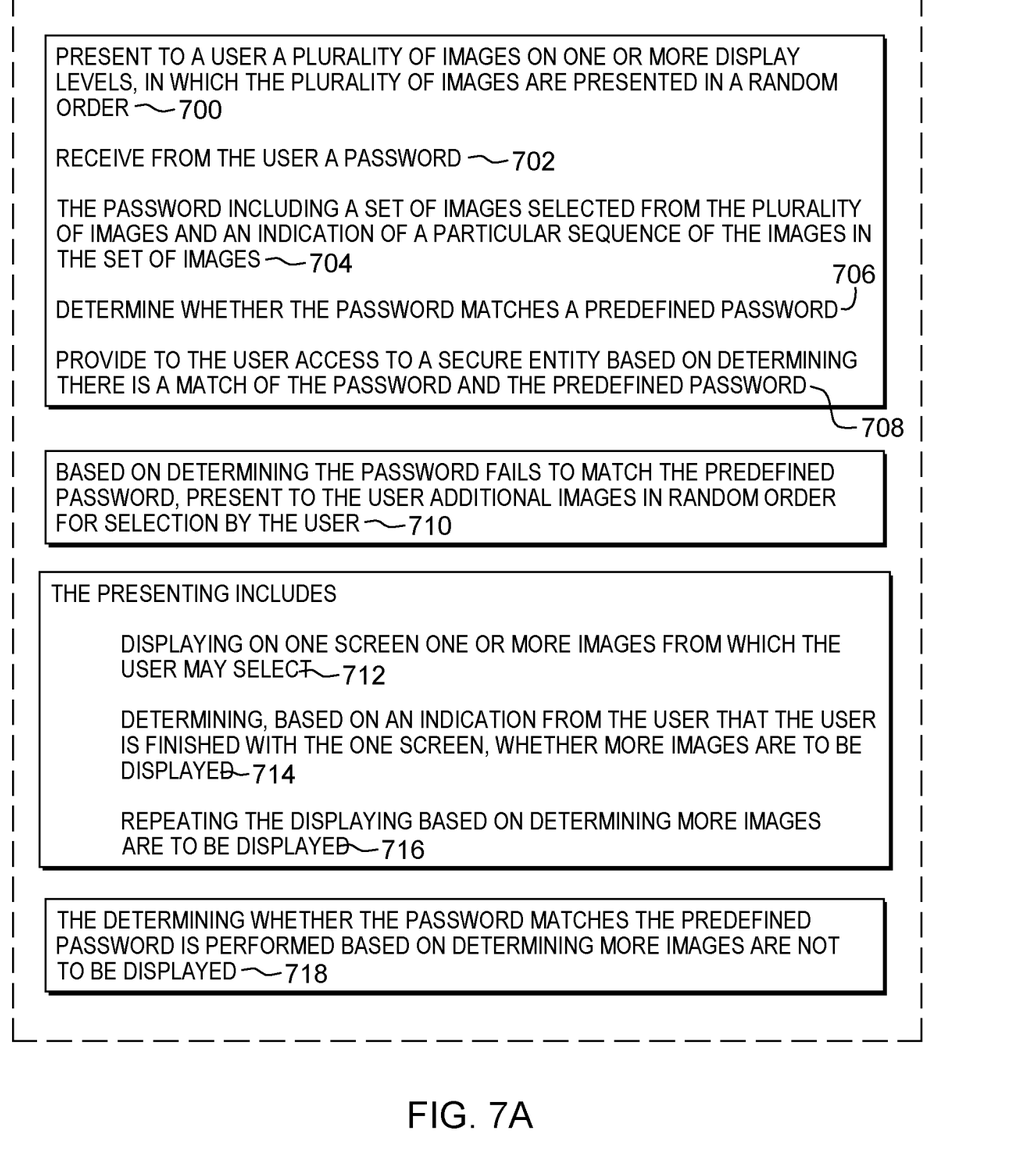
FIGS. 7A-7B depict one embodiment of facilitating authentication, in accordance with an aspect of the present invention.

Referring to FIG. 7A, in one embodiment, a plurality of images on one or more display levels is presented to a user, in which the plurality of images are presented in a random order (700). A password is received from the user (702). The password includes a set of images selected from the plurality of images and an indication of a particular sequence of the images in the set of images (704). A determination is made as to whether the password matches a predefined password (706). Based on determining there is a match of the password and the predefined password, access to a secure entity is provided to the user (708). Further, in one embodiment, based on determining the password fails to match the predefined password, additional images are presented to the user in random order for selection by the user (710).

In one example, the presenting includes displaying on one screen one or more images from which the user may select (712), and determining, based on an indication from the user that the user is finished with the one screen, whether more images are to be displayed (714). Based on determining more images are to be displayed, the displaying is repeated (716).

In one aspect, the determining whether the password matches the predefined password is performed based on determining more images are not to be displayed (718).

Figure 7B:
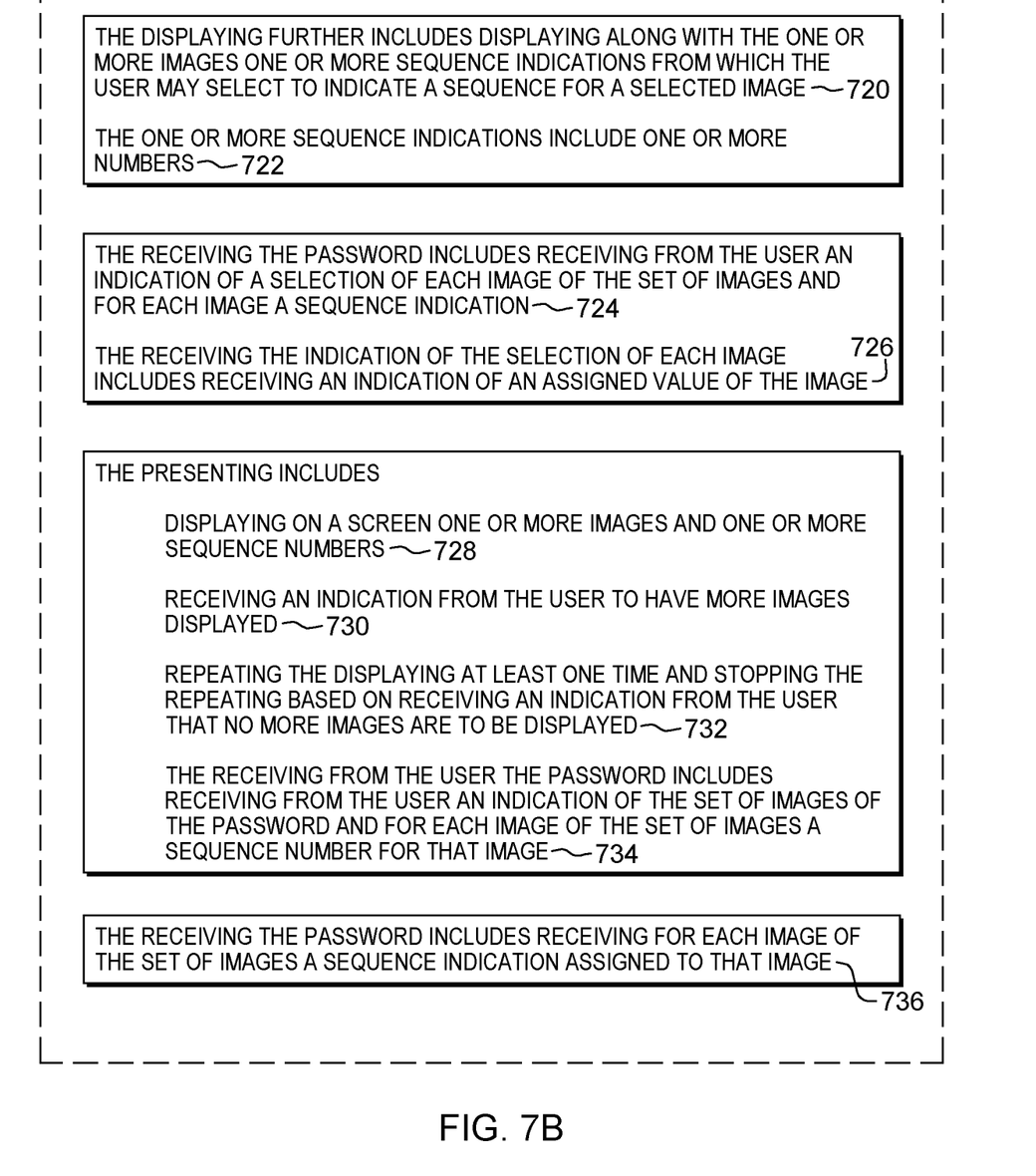

Moreover, with reference to FIG. 7B, in one embodiment, the displaying further includes displaying along with the one or more images one or more sequence indications from which the user may select to indicate a sequence for a selected image (720). The one or more sequence indications include one or more numbers, as one example (722).

As an example, the receiving the password includes receiving from the user an indication of a selection of each image of the set of images and for each image a sequence indication (724). In one embodiment, the receiving the indication of the selection of each image includes receiving an indication of an assigned value of the image (726).

Further, as an example, the presenting includes displaying on a screen one or more images and one or more sequence numbers (728). An indication is received from the user to have more images displayed (730). The displaying is repeated at least one time and the repeating is stopped, based on receiving an indication from the user that no more images are to be displayed (732). The receiving from the user the password includes, for instance, receiving from the user an indication of the set of images of the password and for each image of the set of images a sequence number for that image (734). As an example, the receiving the password includes receiving for each image a sequence indication assigned to that image (736).

In yet one or more other aspects, a user, e.g., employing a device, selects a plurality of images from multiple user-defined images randomly presented to the user. Further, the user, e.g. via the device, assigns a plurality of sequence indications to the plurality of images indicating a particular order for the plurality of images. The plurality of images in the particular order define a password for the user. The password may be used to authenticate the user.

As one example, the particular order is different from an order in which the plurality of images were presented to the user. Moreover, the number of images selected is based on a length of the password. Yet further, the multiple user-defined images are provided by the user employing the device or by another entity.

In one embodiment, the selecting the plurality of images includes choosing from a screen presented, e.g., via the device, an image to be part of the password. Further, the assigning includes assigning a sequence indication to the image to indicate where in the particular order the image belongs. The choosing the image and the assigning the sequence indication to the image are repeated one or more times to define the password. As one example, for each repeating another screen is presented. In another example, based on the repeating one or more screens are presented to the user.

As one particular example, the sequence indication includes a number assigned to the image.

In one aspect, the user uses the password to obtain access to a secure entity. The secure entity may be, for instance, a computer, a mobile device, an account, information, data, or a location, to name a few examples. Many other examples are possible.

As one example, the using the password includes choosing from multiple sets of one or more images presented to the user the plurality of images and providing for each image of the plurality of images the sequence indication. The choosing the plurality of images is performed indirectly.

Various aspects are described herein. Further, many variations are possible without departing from the spirit of aspects of the present invention. It should be noted that, unless otherwise inconsistent, each aspect or feature described herein and variants thereof, may be combinable with any other aspect or feature.

Figure 8A:
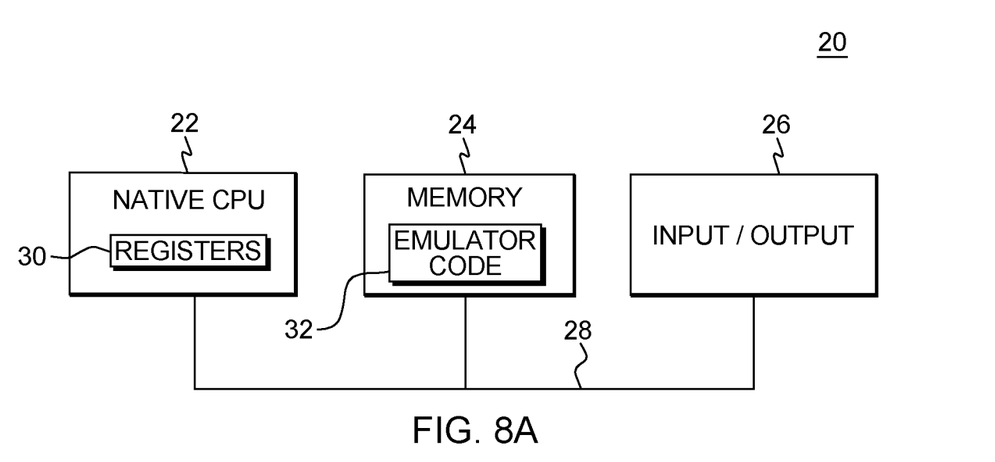
FIG. 8A depicts another example of a computing environment to incorporate and use one or more aspects of the present invention.

Other types of computing environments may also incorporate and use one or more aspects of the present invention, including, but not limited to, emulation environments, an example of which is described with reference to FIG. 8A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 8B:
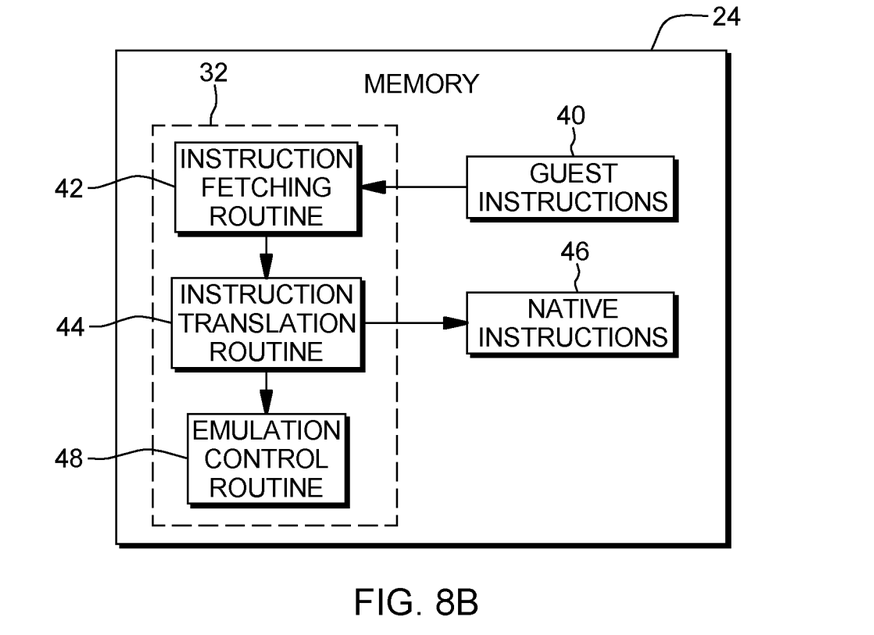
FIG. 8B depicts further details of the memory of FIG. 8A.

Further details relating to emulator code 32 are described with reference to FIG. 8B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
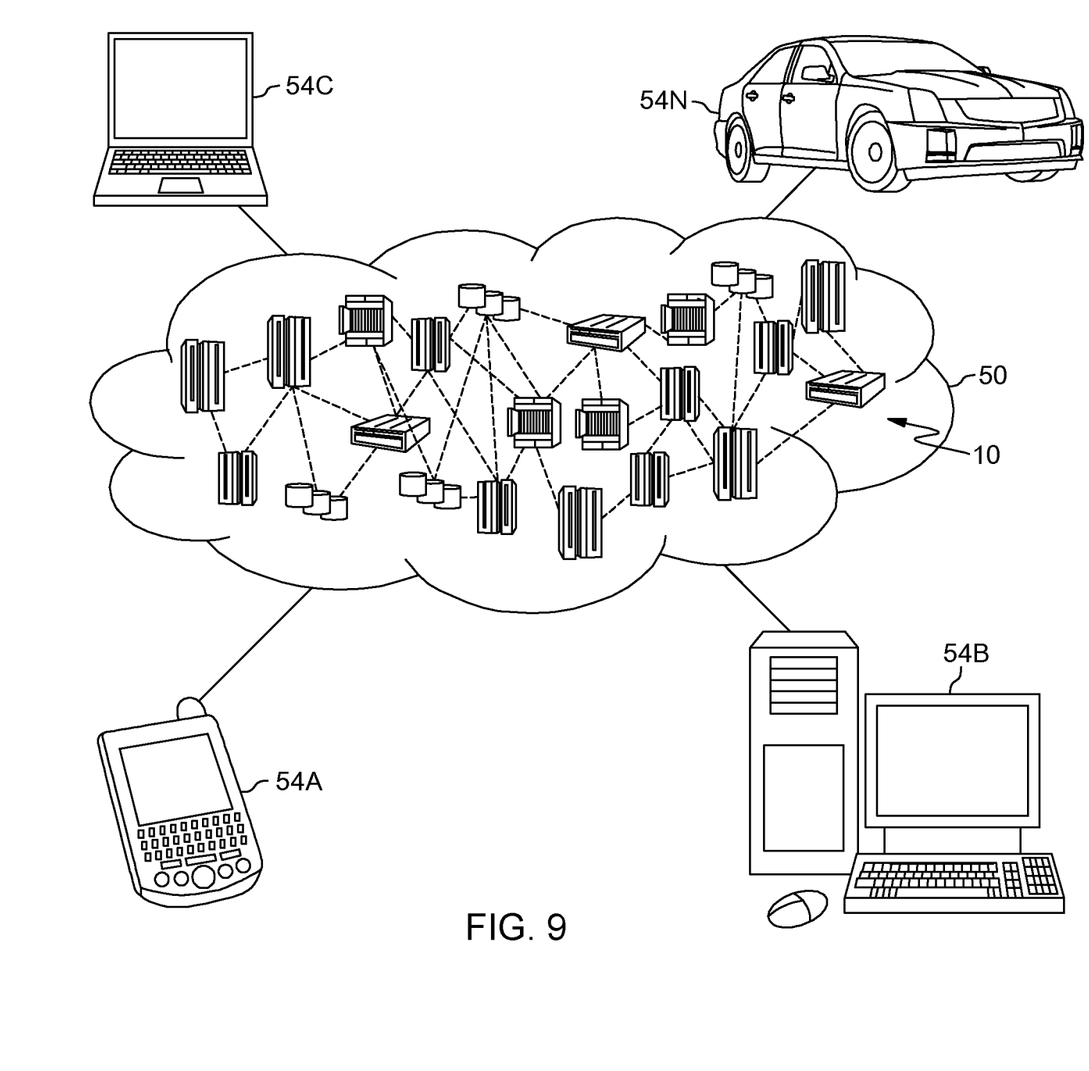
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
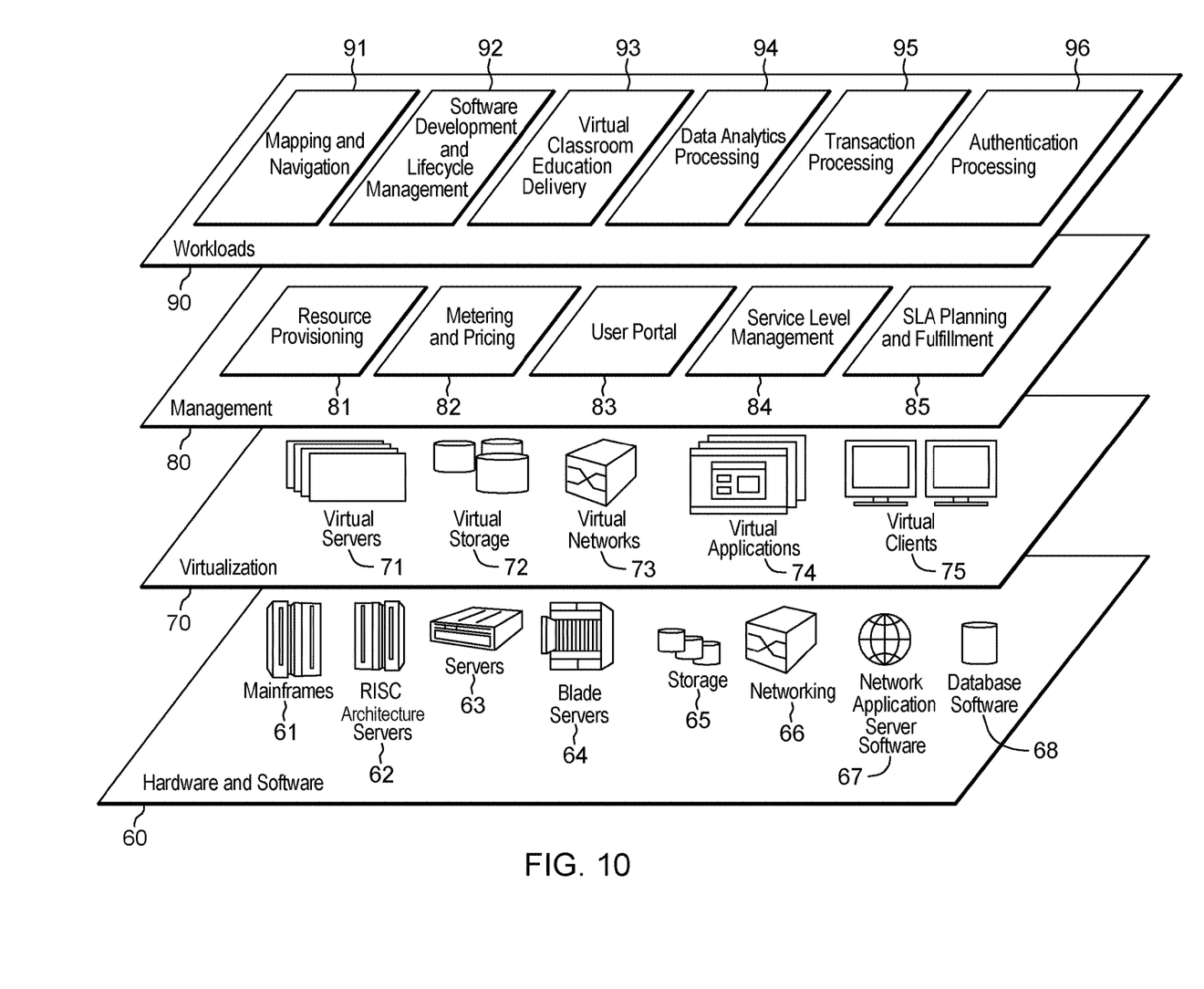
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of systems may be used to create and/or authenticate a password. Also, many type of images may be used. Additionally, the number of screens used and/or the number of images on a screen may vary. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating authentication, the computer implemented method comprising:
   presenting to a user a plurality of images on one or more display levels, wherein the plurality of images are presented in a random order, and wherein the presenting comprises:
      displaying on one screen one or more images from which the user may select;
      determining, based on an indication from the user that the user is finished with the one screen, whether more images are to be displayed; and
      repeating the displaying based on determining more images are to be displayed;
   receiving from the user a password, the password comprising a set of images selected from the plurality of images and an indication of a particular sequence of the images in the set of images;
   determining whether the password matches a predefined password, wherein the determining whether the password matches the predefined password is performed based on determining more images are not to be displayed; and
   providing the user access to a secure entity based on determining there is a match of the password and the predefined password.

2. The computer-implemented method of claim 1, further comprising presenting to the user additional images in random order for selection by the user, based on determining the password fails to match the predefined password.

3. The computer-implemented method of claim 1, wherein the displaying further comprises displaying along with the one or more images one or more sequence indications from which the user may select to indicate a sequence for a selected image.

4. The computer-implemented method of claim 3, wherein the one or more sequence indications comprise one or more numbers.

5. The computer-implemented method of claim 1, wherein the receiving the password comprises receiving from the user an indication of a selection of each image of the set of images and for each image a sequence indication.

6. The computer-implemented method of claim 5, wherein the receiving the indication of the selection of each image comprises receiving an indication of an assigned value of the image.

7. The computer-implemented method of claim 1, wherein the presenting comprises:
  displaying on a screen one or more images and one or more sequence numbers;
  receiving an indication from the user to have more images displayed;
  repeating the displaying at least one time and stopping the repeating based on receiving an indication from the user that no more images are to be displayed; and
  wherein the receiving from the user the password comprises receiving from the user an indication of the set of images of the password and for each image of the set of images a sequence number for that image.

8. The computer-implemented method of claim 1, wherein the receiving the password comprises receiving for each image of the set of images a sequence indication assigned to that image.

9. A computer system for facilitating authentication, the computer system comprising:
  a memory; and
  a processor in communication with the memory, wherein the computer system is configured to perform a method, said method comprising:
    presenting to a user a plurality of images on one or more display levels, wherein the plurality of images are presented in a random order, and wherein the presenting comprises:
      displaying on one screen one or more images from which the user may select;
      determining, based on an indication from the user that the user is finished with the one screen, whether more images are to be displayed; and
      repeating the displaying based on determining more images are to be displayed;
    receiving from the user a password, the password comprising a set of images selected from the plurality of images and an indication of a particular sequence of the images in the set of images;
    determining whether the password matches a predefined password, wherein the determining whether the password matches the predefined password is performed based on determining more images are not to be displayed; and
    providing the user access to a secure entity based on determining there is a match of the password and the predefined password.

10. The computer system of claim 9, wherein the method further comprises presenting to the user additional images in random order for selection by the user, based on determining the password fails to match the predefined password.

11. The computer system of claim 9, wherein the receiving the password comprises receiving from the user an indication of a selection of each image of the set of images and for each image a sequence indication.

12. The computer system of claim 9, wherein the presenting comprises:
  displaying on a screen one or more images and one or more sequence numbers;
  receiving an indication from the user to have more images displayed;
  repeating the displaying at least one time and stopping the repeating based on receiving an indication from the user that no more images are to be displayed; and
  wherein the receiving from the user the password comprises receiving from the user an indication of the set of images of the password and for each image of the set of images a sequence number for that image.

13. The computer system of claim 9, wherein the displaying further comprises displaying along with the one or more images one or more sequence indications from which the user may select to indicate a sequence for a selected image.

14. The computer system of claim 9, wherein the receiving the password comprises receiving for each image of the set of images a sequence indication assigned to that image.

15. A computer program product for facilitating authentication, the computer program product comprising:
  a non-transitory computer readable storage medium readable by a processing circuit and storing instructions for performing a method comprising:
    presenting to a user a plurality of images on one or more display levels, wherein the plurality of images are presented in a random order, and wherein the presenting comprises:
      displaying on one screen one or more images from which the user may select;
      determining, based on an indication from the user that the user is finished with the one screen, whether more images are to be displayed; and
      repeating the displaying based on determining more images are to be displayed;
    receiving from the user a password, the password comprising a set of images selected from the plurality of images and an indication of a particular sequence of the images in the set of images;
    determining whether the password matches a predefined password, wherein the determining whether the password matches the predefined password is performed based on determining more images are not to be displayed; and
    providing the user access to a secure entity based on determining there is a match of the password and the predefined password.

16. The computer program product of claim 15, wherein the method further comprises presenting to the user additional images in random order for selection by the user, based on determining the password fails to match the predefined password.

17. The computer program product of claim 15, wherein the receiving the password comprises receiving from the user an indication of a selection of each image of the set of images and for each image a sequence indication.

18. The computer program product of claim 15, wherein the presenting comprises:

displaying on a screen one or more images and one or more sequence numbers;

receiving an indication from the user to have more images displayed;

repeating the displaying at least one time and stopping the repeating based on receiving an indication from the user that no more images are to be displayed; and wherein the receiving from the user the password comprises receiving from the user an indication of the set of images of the password and for each image of the set of images a sequence number for that image.

19. The computer program product of claim 15, wherein the displaying further comprises displaying along with the one or more images one or more sequence indications from which the user may select to indicate a sequence for a selected image.

20. The computer program product of claim 15, wherein the receiving the password comprises receiving for each image of the set of images a sequence indication assigned to that image.

\* \* \* \* \*